US007042442B1

(12) United States Patent
Kanevsky et al.

(10) Patent No.: US 7,042,442 B1
(45) Date of Patent: May 9, 2006

(54) VIRTUAL INVISIBLE KEYBOARD

(75) Inventors: Dimitri Kanevsky, Ossining, NY (US); Mariusz Sabath, Scarsdale, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 09/603,980

(22) Filed: Jun. 27, 2000

(51) Int. Cl.
*G08G 5/00* (2006.01)
(52) U.S. Cl. .................. 345/169; 157/159; 157/170
(58) Field of Classification Search ............... 345/168, 345/169, 173, 157, 158, 163, 156, 159; 178/18.01–18.03, 178/18.04, 18.05, 18.06, 18.07
See application file for complete search history.

(56) References Cited

U.S. PATENT DOCUMENTS 5,767,842 A * 6/1998 Korth .......................... 345/168
5,917,476 A * 6/1999 Czerniecki .................. 345/173
6,407,679 B1 * 6/2002 Evans et al. .................. 341/20
6,421,453 B1 * 7/2002 Kanevsky et al. .......... 382/115

* cited by examiner

*Primary Examiner*—Xiao Wu
*Assistant Examiner*—Jean Lesperance
(74) *Attorney, Agent, or Firm*—Scully, Scott, Murphy & Presser; Daniel P. Morris

(57) ABSTRACT

The invention uses a recognition system of gestures that maps sequences of gestures to keys strings. In the practice of this invention, a user produces gestures without keyboards. Many experienced typists can type without looking at keyboards, and typists can make gestures, in the absence of a keyboard, that are similar to gestures that would be made if there were a keyboard. The gesture recognition system captures gestures for example, (via cameras) and interprets them as pressing an invisible keyboards, as if a keyboard were actually placed in a certain location under the typists hands. To coordinate the invisible keyboard in the correct place under the hands, the user may be provided with feedback. He or she can either view the results of the gestures via a display or hear sounds, via speakers, indicating the results of the gestures.

21 Claims, 11 Drawing Sheets

VIRTUAL INVISIBLE KEYBOARD

BACKGROUND OF THE INVENTION

This invention generally relates to gesture recognition systems. More specifically, the invention relates to generating text or data from typing gestures made without the presence of any physical keyboard.

It is difficult to type using small keyboards in miniature devices such as palmtop computers, smart phones etc. The use of Automatic Speech Recognition (ASR) to eliminate the need for keyboards is not always possible. For example, these speech recognition systems may not be effective in noisy environments, or in an office in which several people are present. Automatic Handwriting Recognition (AHR) can be used to enter data, but this requires a special tablet and is slower then typing. The gyroscope pen, which is part of AHR, does not require a tablet but is very inaccurate and slower than typing.

SUMMARY OF THE INVENTION

An object of this invention is to provide a virtual keyboard.

Another object of the present invention is to provide a gesture recognition system for generating text based on typing gesture made without the use of any physical keyboard.

These and other objectives are attained with the present invention, which uses a recognition system of gestures that maps sequences of gestures to keys strings. In the practice of the invention, a user produces gestures without keyboards. Many experienced typists can type without looking at keyboards; and typists can make gestures, in the absence of a keyboard, that are similar to gestures that would be made if there were a keyboard.

The gesture recognition system captures gestures for example, (via cameras) and interpret the gestures as pressing an invisible keyboards as if a keyboard were actually placed in a certain location under the typists hands. To coordinate the invisible keyboard in the correct place under the hands, the user may be provided with feedback. He or she either view the results of the gestures via a display or hear sounds, via speakers, indicating the results of the gestures.

One can use also music to provide a feedback about the user's hand positions above a virtual invisible keyboard.

It is well known that gestures can represent complex meanings (for example, sign language). There also exist automatic sign language recognition systems. These sign language recognition systems map gestures into meanings.

The invention allows to maps special gestures into keys. The invention uses the technique of taking samples of gestures, generating frames of gestures, and generating classes of gestures. Such a technique is disclosed in co-pending patent application Ser. No. 09/079,754, filed May 15, 1998, for "Apparatus and Method for user recognition employing behavioral passwords," the disclosure of which is herein incorporated by reference. Keys can be associated with classes of gestures using Hidden Markov Models (HMMs) techniques. Strings of keys that have the largest likelihood (given strings of gesture frames) are produced as the output keys.

This model is assisted by the variant of language and character models for keys that exist in speech and handwriting recognition.

The virtual keyboard can be user-dependent or user-independent. The user-dependent virtual keyboard may require training, which can be done using a training script.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
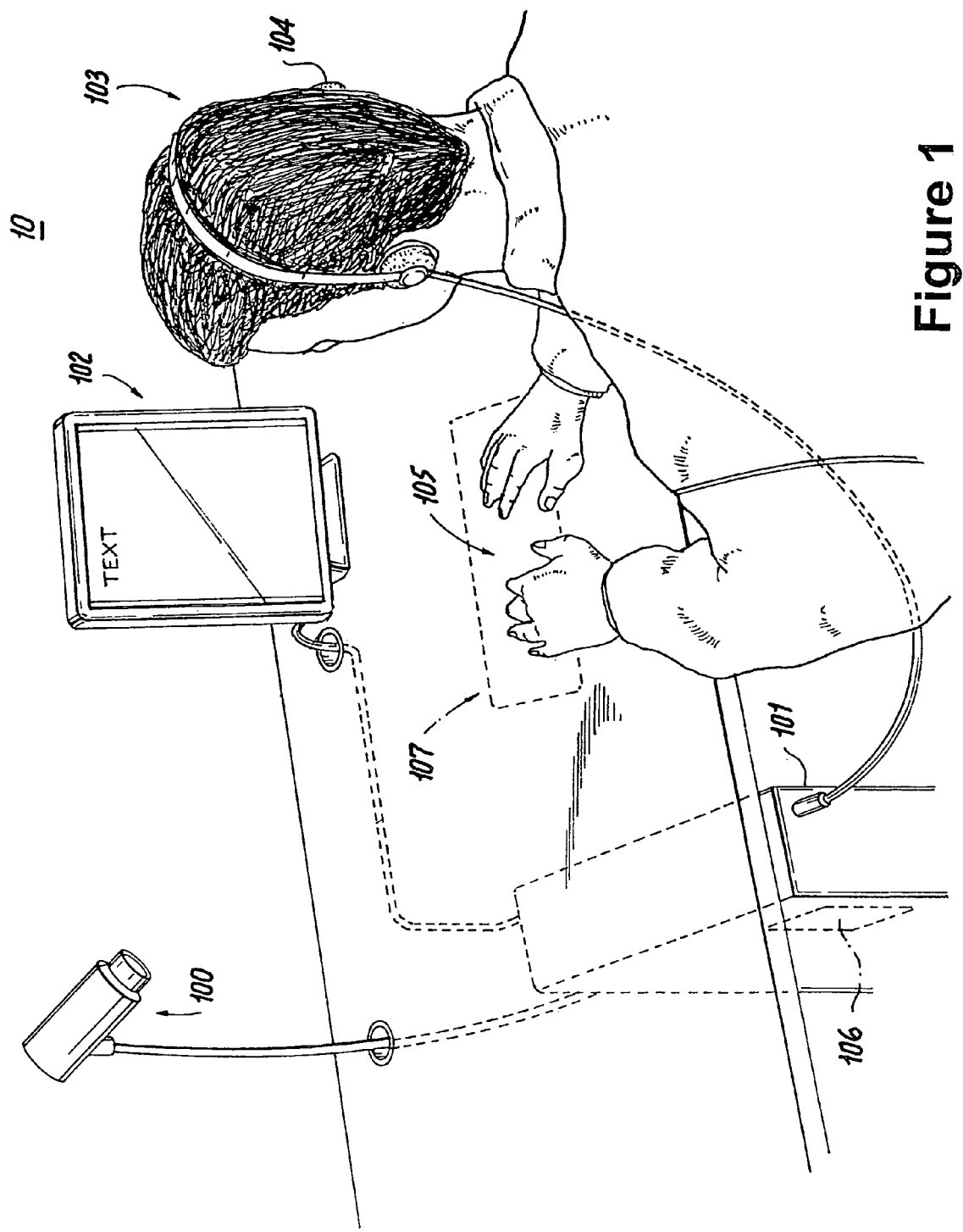
FIG. 1 is a general diagram that illustrates the present invention.

FIG. 1 illustrates an information input processing, gesture-key mapping computer system 10. System 10 includes one or several cameras 100, one or more memories with CPU 101 connected to the cameras, and processes 106 running in the CPU that associate gesture movements 105 with typing and that produce gesture associated textual output on a display 102.

The user 103 makes hand and finger movements as if he or she were typing on a keyboard 107. The user can imagine the keyboard. The user can approximately moves his or her hands, trying to imagine how he or she would move the fingers if there were a real keyboard. As FIG. 1 clearly shows, these gestures are made without touching any touch sensors.

The user can get feedback on how his or her gestures are interpreted. This feedback can be provided to the user via speakers 104 on what kind of keys are associated with his gestures. This allows the user to relate his or her movements to a basic keyboard position. Most typists are capable of typing without seeing a keyboard if they place their hands in the basic position relative to their keyboards. Users can easily adapt these typing skills—that is, typing without looking at the keyboards—to imitating typing without any keyboard at all. Sound feedback can either spell out over which "imaginable keys" some fingers are located or to produce some sounds if the hands are moved away from the basic keyboard position.

Figure 8:
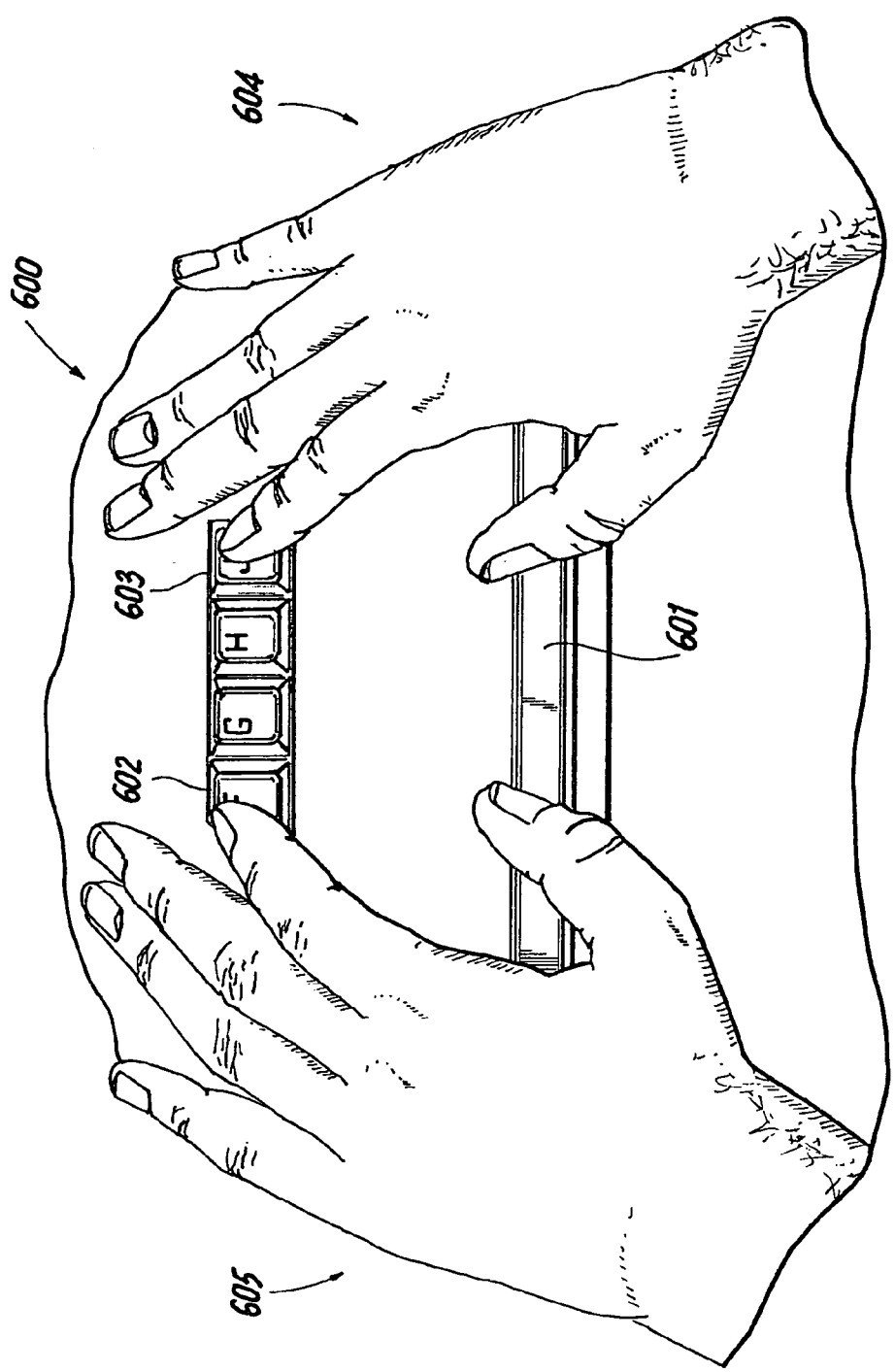
FIG. 8 shows an example of a basic position of a user's hands relative to a keyboard.

An example of a basic typical hand starting position is shown in FIG. 8 and explained in the discussion of FIG. 8 below.

Figure 2:
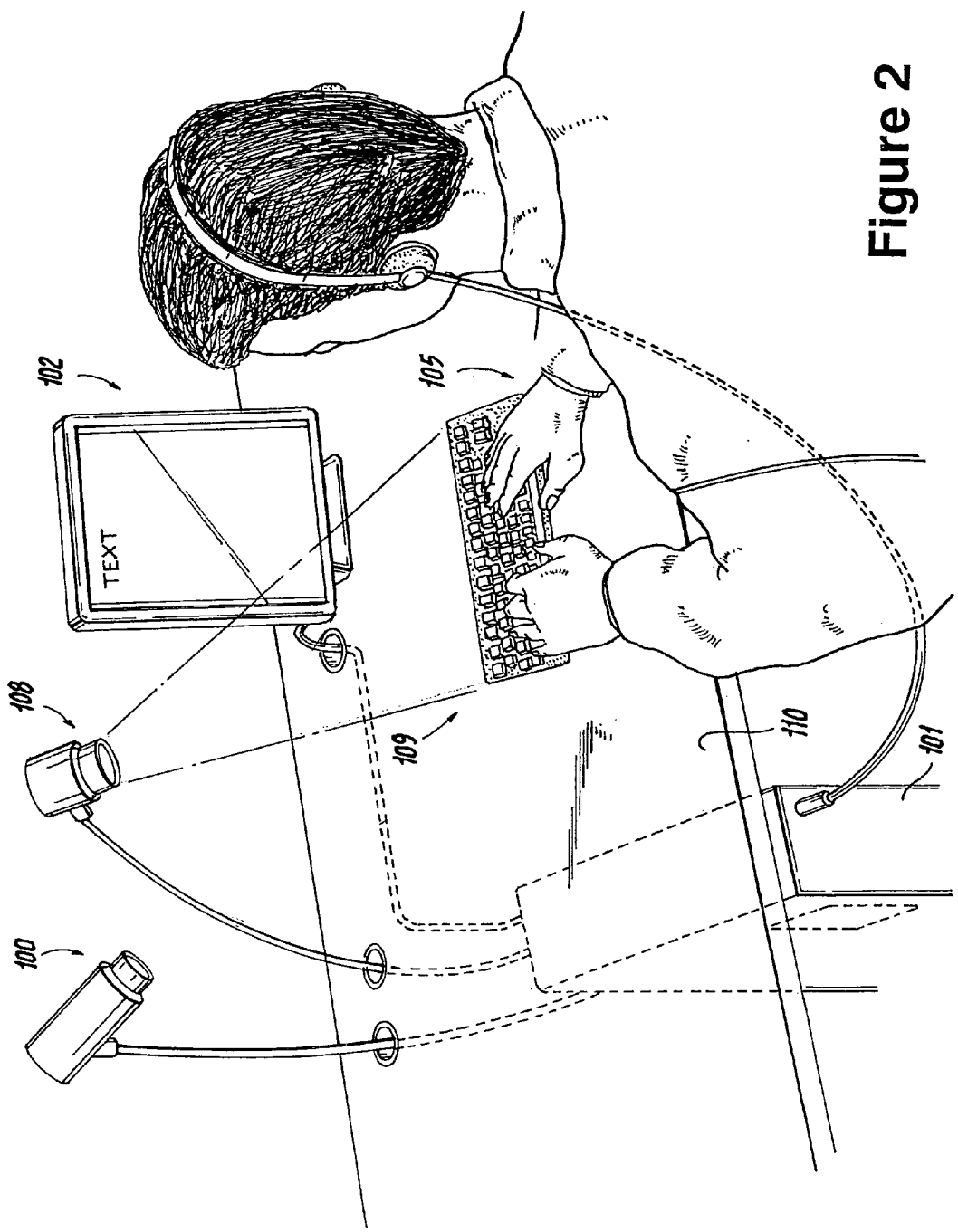
FIG. 2 illustrates a variation of the invention, in which a virtual keyboard is produced by a projector.

Another way to provide feedback to the user on how the keys are located is shown in FIG. 2. In this Figure, the projector 108 projects a keyboard picture 109 on some surface 110. This surface can be a table cover, or a part of a user cover dress, a wall, etc. A projector can be located in a camera or other embedded devices (watches, pda etc.) The above-mentioned application Ser. No. 09/079,754 provides an example of how a projector can project an image on a curved cover. Another patent application U.S. Pat. No. 6,371,616 shows how projects can be placed in embedded devices.

The feedback can also provided on the display 102 where the user sees what text is generated when the user moves his or her hands. For example, a user can make a movement by a finger like he/she hits a key and he/she by a right hand sees that the letter "H" is printed. If a standard initial position for hands requires that a letter "J" was typed, the user can move his or her right hand slightly left in order to print the correct symbol. Similarly, the user can correct the position of the left hand.

Figure 3:
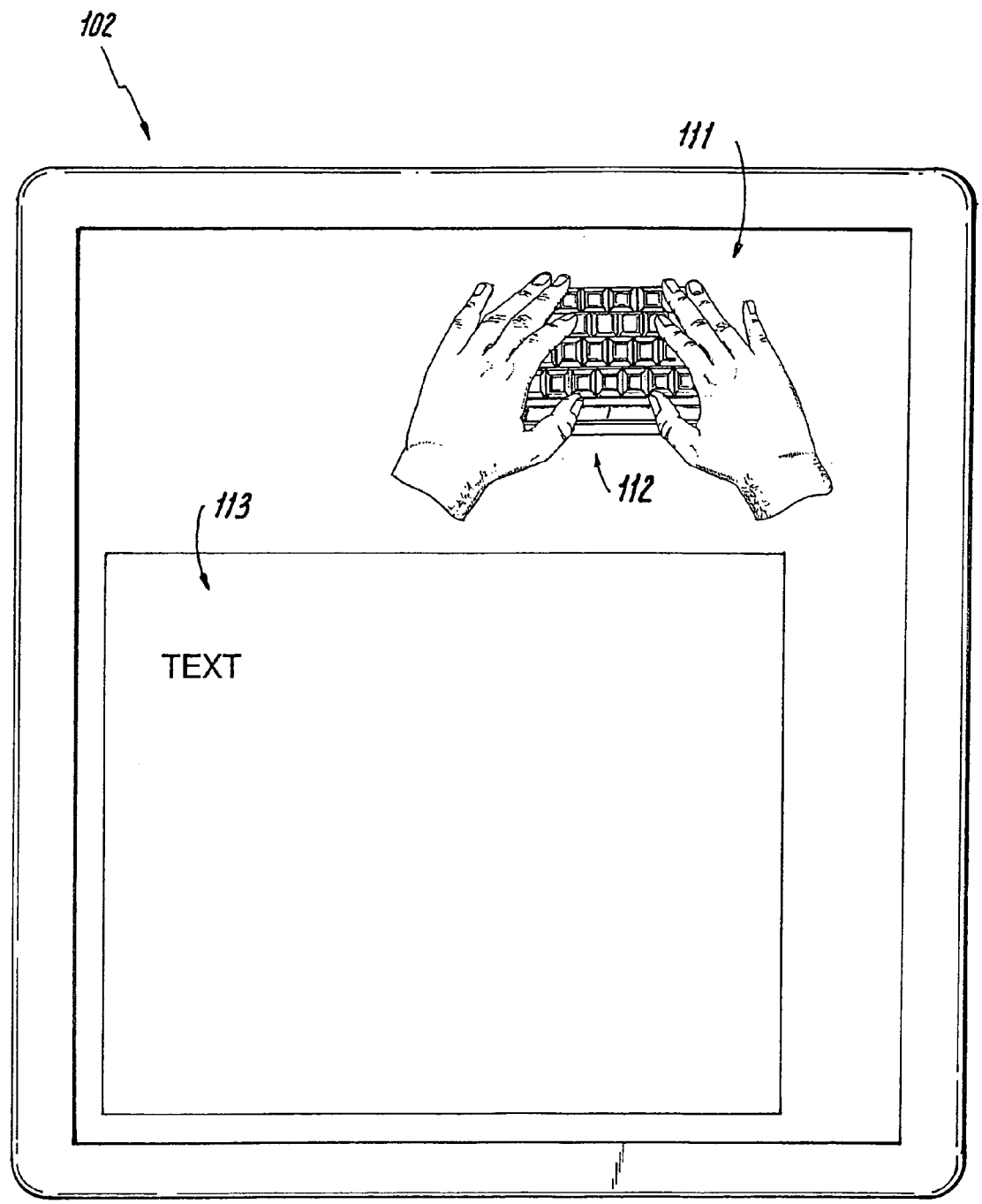
FIG. 3 shows a virtual keyboard on a display.

The display 102 also can display a picture of the virtual keyboard, with images of the users hands that are captured by the camera 100. This image of the virtual keyboard can be presented from time to time to correct the user's basic position. This is illustrated in FIG. 3. In this Figure, display 102 has a picture of a virtual keyboard 112 and captured images of the user's hands 111. This image shows the relative position of the user's hands over the keyboard. The picture of the keyboard can be small and placed in a corner of the display, in order to not disturb viewing of a textual data 113 on the display.

Another way to relate an invisible keyboard to hand positions is to use automatic means that move an invisible keyboard to place it under the hands if the user moves his or her hands. This is done by a process 106 and is explained in detail below in the discussion of FIG. 9.

Figure 4:
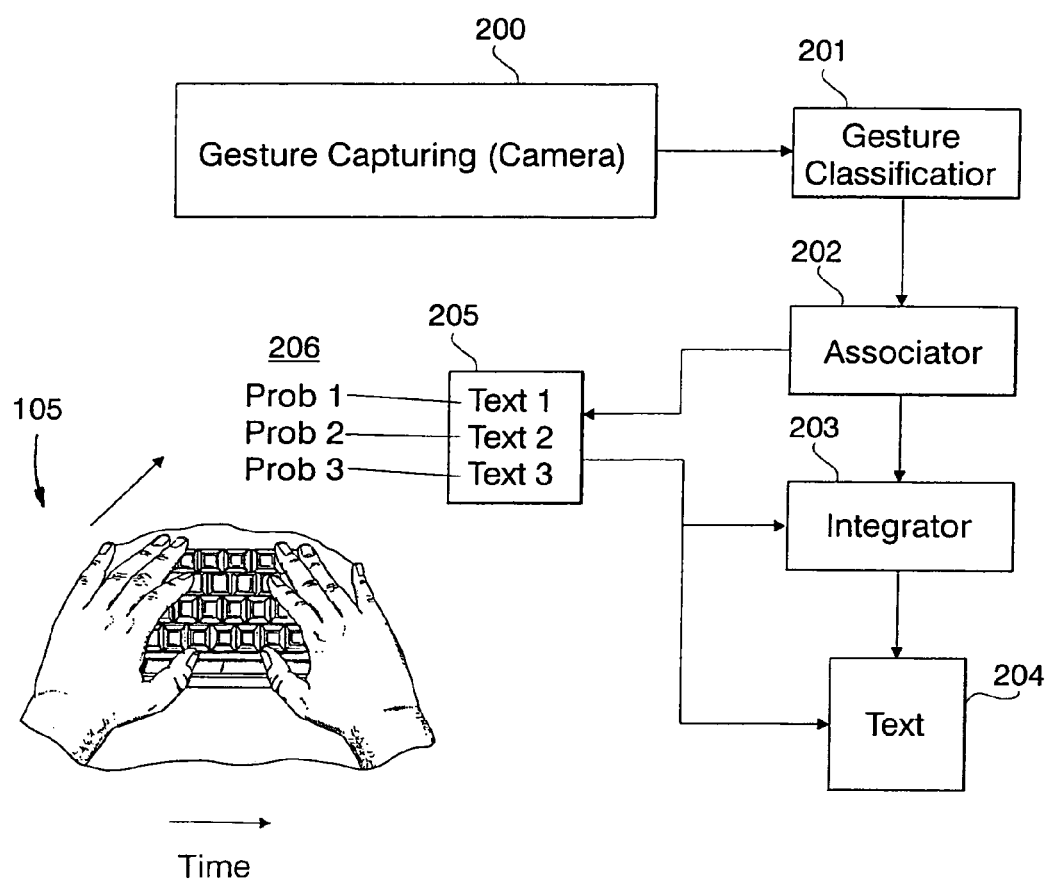
FIG. 4 is a block diagram showing a gesture-key processing module.

FIG. 4 shows a block-scheme of a gesture-key processing module. The gesture-key process 106 is running in CPU 101. This process involves the following modules: a gesture capturing module 200; a gesture classificator module 201; an associator module 202; and an integrator module 203.

Gesture capturing module 200 captures gestures 105 through camera sensors 100. Gestures can be captured at some intervals of time (e.g. every ms). A string of gestures form gesture frames (labeled by times). There is a very large number of possible gestures that can be produced when a user intends to perform some action (e.g. move a finger to a certain key). It is necessary to reduce the variety of gestures to a small number of most essential gestures—gesture classes. For this, a string of gesture frames is processed by the gesture classifies gestures into classes of gesture movements. Gestures consist of moving objects and trajectories along which points in these objects are moved. There are many ways to classify gestures into classes. In order to classify gestures, objects in gestures (e.g. fingers) are normalized (to have some average typical size).

Trajectories, along which points in objects (e.g. fingers) are moved, are clustered if they are close. For example, near vertical movements of fingers are put into the class "vertical" movement. One way to associate classes to gesture frames to gesture classes is explained in the above-mentioned co-pending patent application Ser. No. 09/079,754.

Figure 7:
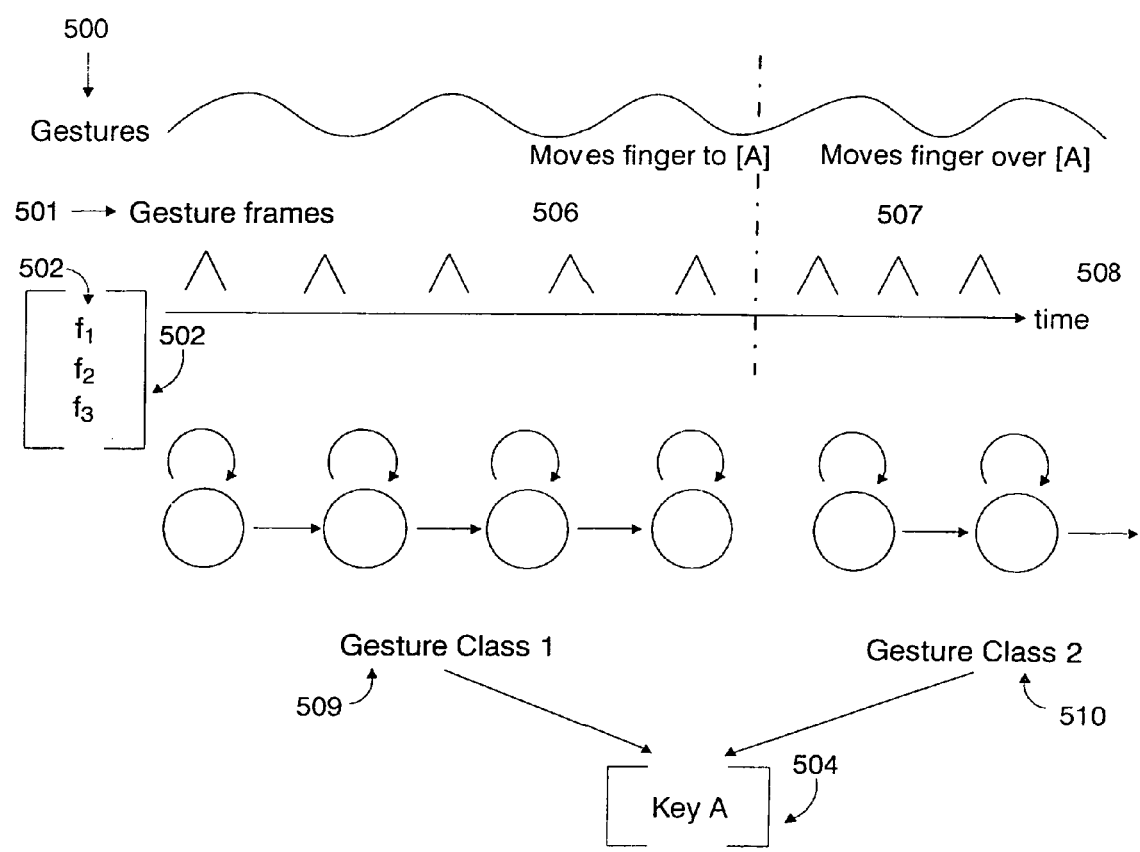
FIG. 7 is an illustration of several steps in the recognition of a key from user gestures using Hidden Markov Models (HMM).

Associator module 202 associates gesture classes or sequence of gesture classes with one or several most probable keys. Gesture classes sequences can be represented, for example, as follows: move left finger up by half inch, left by one inch, down by an one inch. These sequences of classes of gestures can correspond to movement of a finger from a basic position at key "F" to a key "G" or a key "H." If the key "G" is closer to the finger than the key "H" then one can conclude that the user intended to press the key "G" with higher probability than the key "H." Using some mathematical models, choices of these possible keys "G" or "H" can be represented with some probability scores. Examples of such steps that allow one to compute probability scores of possible choices of keys are illustrated in FIG. 7. Different probable sequences of keys associated with gestures are represented in 205 as different tests: text1, text2, text3, . . . Each of these different sequences is associated with a probability value 206 (of having this key given gestures). These probability values are used by the integrator module 203.

Integrator module 203 integrates a sequence of candidates of most probable keys into a unique output key sequence. This module is explained in FIG. 5. The output of the integrator module 203 is a text 204 that can be either observed by a user (on the display 102) or played back by speakers 104.

Figure 5:
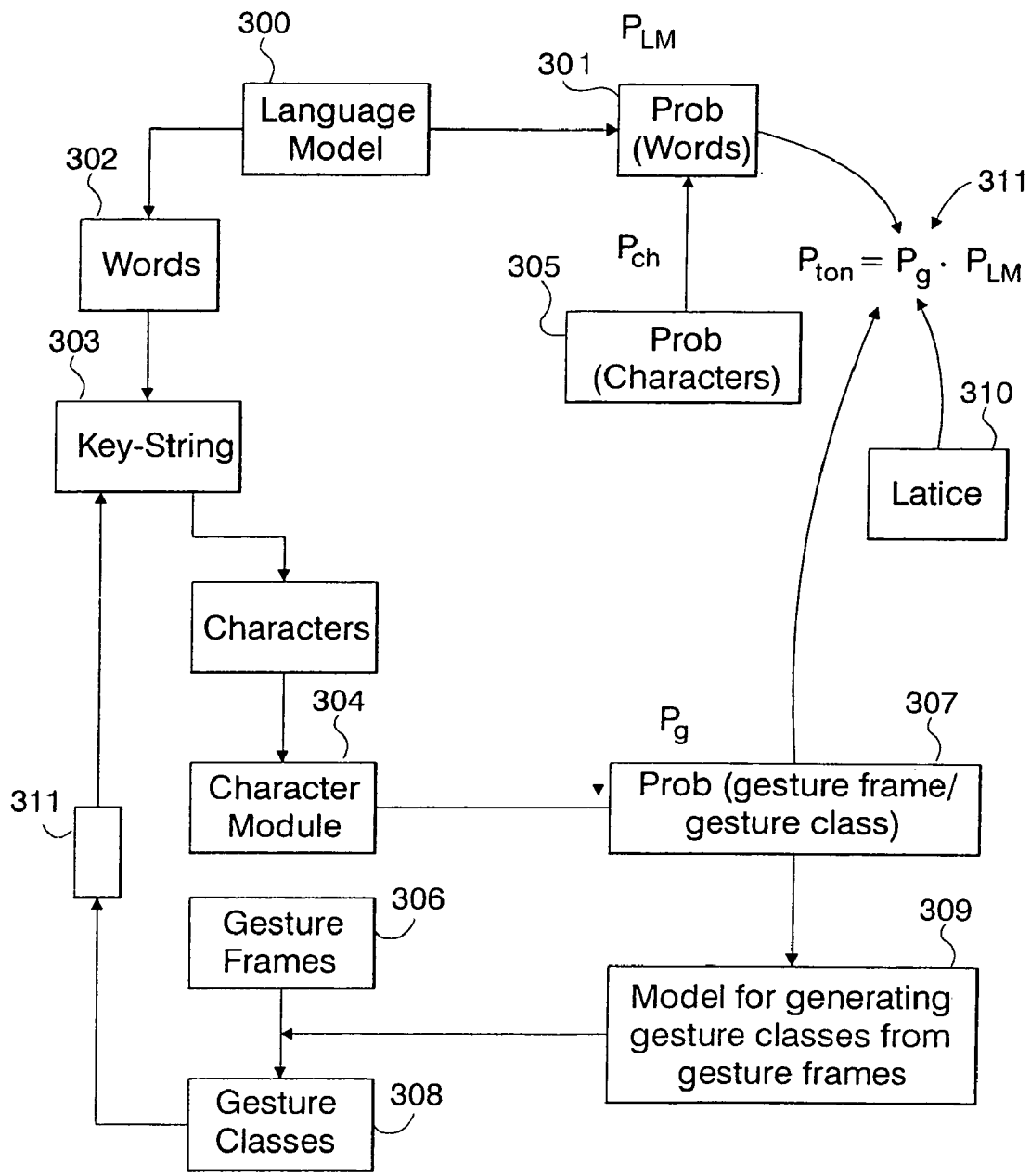
FIG. 5 is a block scheme showing an integrator module.

FIG. 5 is a block diagram for the integrator module 203. This module 203 includes the following components: language module component 300; and character frequency module 304.

Language model component 300 estimates probabilities $P\_lm$ 301 of word strings 302 corresponding to key candidate sequences 303. Language models can be built as typical LM components in speech recognition or machine translation machines. An overview of typical Language Models is given in Frederick Jelinek, "Statistical Methods for Speech Recognition", The MIT Press, Cambridge, 1998. Language Model allows the elimination of strings of words that have low LM scores.

Character frequency module 304 estimates probabilities 305 of character strings 307 corresponding to key candidate sequences 303. The character module 304 is coupled with the block 305 (since it computes probabilities of character strings). The block 305 is coupled with the block 301, where probabilities of word strings are computed. Probabilities of character strings are used to modify probabilities of word strings. There are several ways to combine probabilities of character strings with LM probabilities from 300. One way is to represent the probability of a word as a weighted sum of the probability of a character string that represents the word and a unigram prob of this word in the LM.

As an example, the word "fish" contains the characters F, I, S and H. A score associated with the characters could be computed in character model 304 as the product of the scores $Prob\_ch(FISH)=Prob(F)*Prob(I|F)*prob(S|H)*Prob(H)$, where $Prob(ch\_2|ch\_1)$ is the probability of having the next character $ch\_2$ given a current character $ch\_1$. These probabilities can be estimated from counts of characters and 2-tuple of characters from some textual corpus. Let the LM probability of the word FISH be $Prob\_lm(FISH)$ can be obtained as a count of the word FISH that was met in some textual corpus divided by a whole word count in the same corpus. The final unigram probability of this word FISH can be computed as the weighted sum $Prb\_u(FISH) =\alpha*Prob\_(FISH)+\beta*Prob\_lm (FISH)$, where the coefficients \alpha and \beta can be estimated from some training data.

The formula for scores of characters $Prob\_ch$ can include probabilities for mistyping of characters. For example, if someone typed FISG and there is high probability of confusing G and H on a keyboard, then candidates for FISH can be also considered and $Prob\_u(FISH)=\alpha*Prob\_ch$ (FISG)+\beta*Prob_1m(FISH. Confusable keys can also be produced when gesture classes are confused by the gesture classificator module 201.

In order to deal with confusion of gesture classes, one can use a confusable matrix that estimates how often correct gesture classes are confusable with other gesture classes. This confusion matrix can be used in 309, which computes probability scores 307 related to gesture classes 308 corresponding to gesture frames 306.

An example of a gesture classes probability model 307 that estimates the probability of observing a string of gestures classes given a sequence of gesture frames, is shown in FIG. 7 (where it is modeled by HMM). Probability of gesture classes given gesture frames Prob(gesture classes|gesture frames) can be obtained via Bayes equation.

Prob(gesture classes|gesture frames)~Prob(gesture frames|gesture classes)*Prob(gesture classes) (where~means proportional). An explanation for the Bayes approach can be found in the above-mentioned "Statistical Methods for Speech Recognition", by Jelinek The MIT Press, Cambridge, 1998.

The computation of a probability $P\_g$, in 307, of production a sequence of keys, given a string of gesture frames, is preferably done by computing the probability of a sequence of keys given sequence of gesture classes, and the probability of gesture classes, given sequence of frames. The computation of probabilities of keys, given gesture classes, can be done as described the above-mentioned patent application Ser. No. 09/079,7854. In this patent application, a general approach is given for the interpretation of gesture classes into symbols (e.g. passwords elements). Interpreting gesture classes into keys can be considered as a special case of the approach that is described in this patent application.

Computing scores for possible strings of keys, given a string of gesture frames, and selecting only strings of keys with scores above some threshold, generates a lattice 310 of sequences of keys given sequence of gesture frames.

The final key sequence is selected by finding the most probable sequence of keys from the lattice of key candidate strings using a formula 311. A total probability of a sequence of keys, given a sequence of gesture frames, can be obtained as the product of the probability of $P\_g$ (gesture part) and $P\_1m$ (language model part) that were described above.

Figure 6:
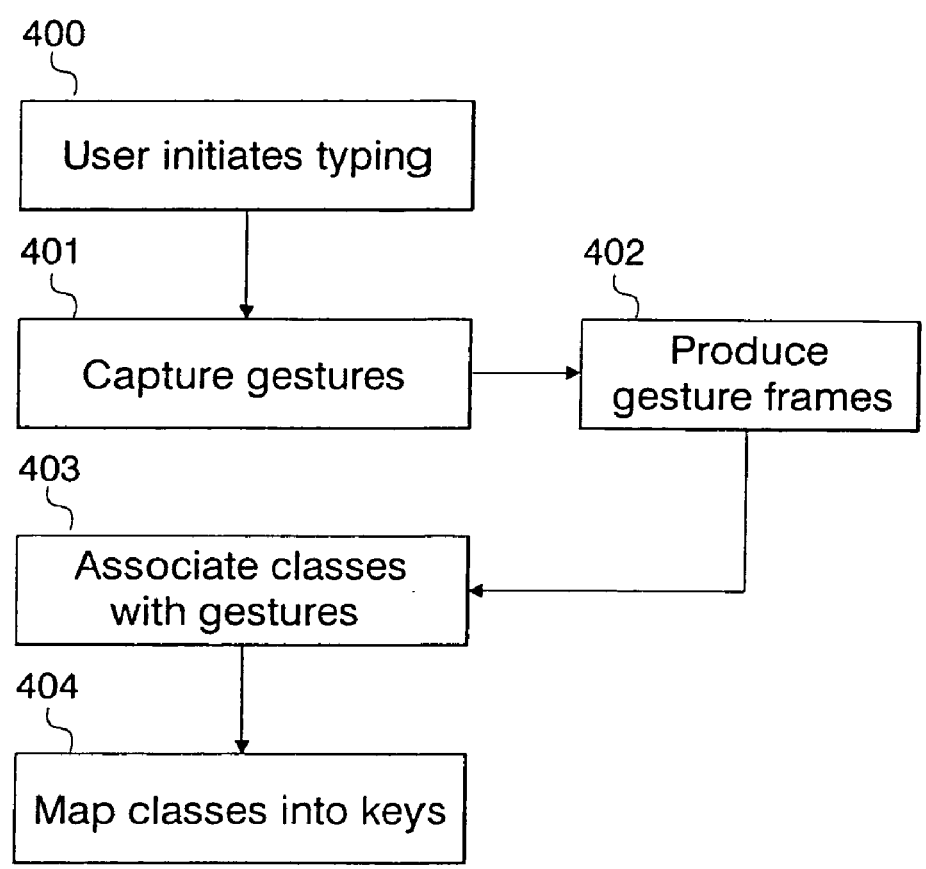
FIG. 6 is a flow chart outlining a method embodying this invention.

FIG. 6 is a flow chart of a method embodying this invention. This method produces a textual output, in which the user makes typing like gestures without the presence of the keyboard, and the gestures are associated with the most likely keys that would be typed if a keyboard were present.

The user makes gestures that imitate typing 400. User gestures are captured by sensors 401. Captured gestures are used to produce frames 402. Then, gesture frames are associated with gesture classes 403. Then, at 404, gesture classes are mapped into keys.

FIG. 7 illustrates several steps in the recognition of a key from user gestures using HMM. The user produces gestures 500. For example, the user moves a finger to a key A 504 and keeps a finger over the key A for some short period 505. These gestures are captured, and gesture frames 501 are extracted. These gestures are time aligned and a sequence 502 of gesture frames f1, f2, f3 is ordered at some intervals of times 508.

These gestures frame sequences are compared against HMM models, e.g. 509 and 510. Each of these HMM models some gesture class (e.g. MOVE_FINGER_LEFT or HOLD_FINGER). States of this HMM produce frames as output (e.g. f'1_i, f'2_i, . . . in block 503). Each HMM allows to compute the probability of generating the sequence of frames 502 given this HMM, 509 for gesture class 1 and 510 for gesture class 2 in the example. This gesture score is denoted as 307 in FIG. 5.

These scores are used to compute total scores according to the description for FIG. 5. If the sequence of HMM 509, 510 has the highest score among other sequences of HMM it is accepted as the most likely score among other sequences of gesture classes. This sequence of gesture classes (MOVE_FINGER_LEFT and HOLD_FINGER) will be associated with a key A if it happened near A.

FIG. 8 describes a typical basic starting position of hands over the keyboard 600 that are suggested in typical typing tutors. A right hand is placed in such a way that a finger 603 is located over "J" key and a left hand 602 is placed in such a way that a finger is placed over "F" key. Other fingers are placed relative to space bar 601.

Figure 9:
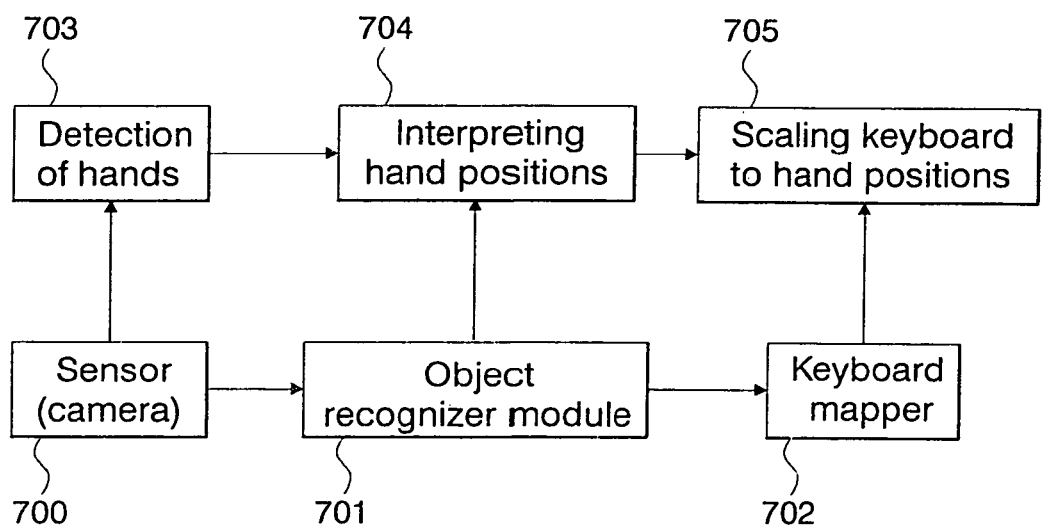
FIG. 9 is a block diagram of an automatic keyboard/hands position correlator.

FIG. 9 is a block scheme of an automatic keyboard/hands position correlator.

The gesture correlator module allows to adjust automatically an invisible keyboard to hand positions. It allows the detection of situations when a user moves his or her hands aside or closer. Conventionally, during typing, the hands are mostly kept without movement (in a basic position) and only the fingers are moving. Therefore, if the user moves the hands significantly when he or she keeps the hands over the imaginary keyboard—this most likely indicates that the user has lost his basic hand position (FIG. 8). The automatic correlator can catch these movements and make a keyboard longer (if the user moved the hands aside) or shorter if the user moved the hands closer. The automatic correlator is running in 101 in FIG. 1. It acts between gesture classificator module 201 and gesture associator module 202 (since keys are associated with gesture classes when they are properly mapped over the keyboard image).

In the procedure outlined in FIG. 9, the hands are captured by the sensors (camera 700—corresponds to 100 in FIG. 1). Sensors 700 detect pictures of hands 703. The object recognition module 701 detect parts of captured pictures that are hands 704. This object recognition is done as described in the above-mentioned patent application Ser. No. 09/079, 754. The keyboard mapper module 702 scales the keyboard to fit it to hand positions 705 (i.e. places some basic keys some distances from relevant parts of the hands, as can be seen in FIG. 8).

Figure 10:
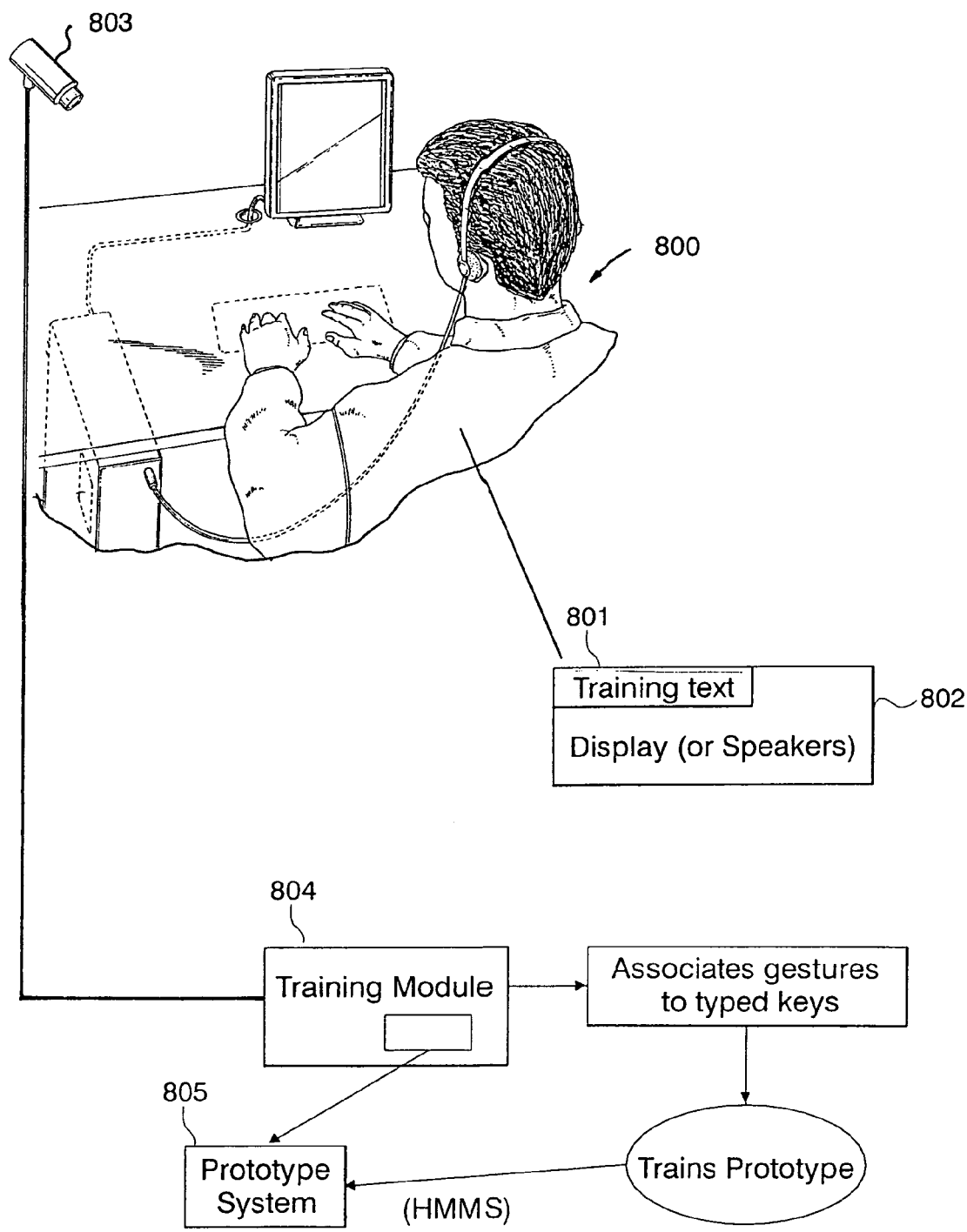
FIG. 10 is a block diagram showing a user dependent virtual keyboard.

FIG. 10 illustrates a method employing a user dependent virtual keyboard. The user-dependent virtual keyboard requires training based on the training script. The user block 800 reads training data 801 that he sees on display 802 or that he hears through the speaker. Training data comes in words or sentences with certain timing intervals. When the user sees the word, he is imitating the typing of the word. The camera 803 captures his gesture and sends it to the training module 804. In the training module, the sequence of the user's gesture is aligned with a training word. Each gesture is associated with a keyboard letter. The association can be done using gesture independent system. This training is similar to ASR or AHR training. During the training process, the gesture recognition prototype system 805 is trained. In one embodiment of this invention, this prototype system is based on HMM. The HMM contains the states that correspond to the character and output arcs produce output label that correspond to gesture classes. Gestures are classified similar to the manner disclosed in patent application Ser. No. 09/079,754.

Figure 11:
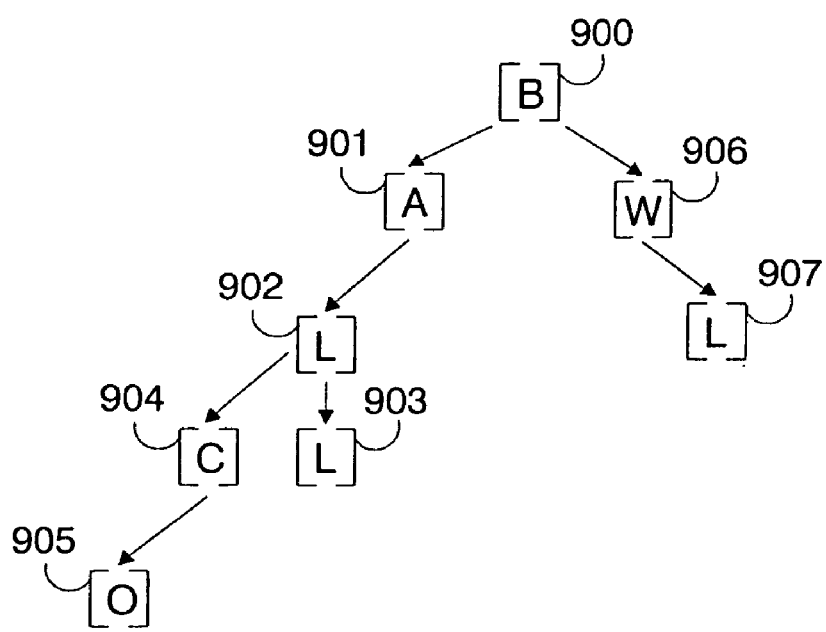
FIG. 11 shows an example of a tree representation of different probable sequences of keys associated with gestures.

FIG. 11 shows an example of a tree representation of different probable sequences of keys associated with gestures.

Nodes in the tree represent keys (e.g. [B] for 900) that were produced by a block 303 in FIG. 3. Going down in the tree, from a node to a node, produces possible sequences of keys, e.g. [B] [A] [L] [L] (900, 901, 902, 903, or [B], [A], [L], [C], [O], [N], (900, 901, 902, 904, 905) or [B] [W] [L] (900, 906, 907).

Each such sequence of keys receives a probability score. The sequences of keys that receive low scores (e.g. 900, 906, 907) are removed and are not continuing when new candidates for keys arrive.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. An information input processing computer system for mapping gestures to keys of an invisible virtual keyboard, the system comprising one or several cameras, one or more memories with CPU connected to the cameras, and processes running in the CPU that associate gesture movements made without touching any touch sensors with typing and produce gesture associated textual output, wherein said processes capture gesture images, classify the gesture images into classes, associate each of the classes with one or more possible keys of the invisible keyboard, for each of said classes, assign a probability to each of the possible keys associated with the class, and integrate the probabilities assigned to the possible keys to identify a word for a sequence of gestures; and wherein the processes that integrate the probabilities use one or more of the following:
   a) language module component that estimate probabilities of word strings corresponding to key candidate sequences;
   b) character frequency module that estimate probabilities of character strings corresponding key candidate sequences;
   c) confusable matrix that estimate how often correct gesture classes are confusable with another gesture classes;
   d) gesture classes probability model that estimate probability of observing a string of gesture classes given a sequence of gesture frames;
   e) computation of a probability of production a sequence of keys given a string of gesture frames;
   f) generation of a lattice of sequences of keys given sequence of gesture frames;
   g) finding the most probable sequence of keys from the lattice of key candidate strings.

2. The gesture-key mapping system as in claim 1, where a feedback is provided to the user on what kind of keys are associated with the user's gestures.

3. The gesture-key mapping system as in claim 2, where the feedback is provided using one or more of the following: displaying keys on a display, playing sounds labels for keys, displaying image indicators on a display, playing special sound indicators, projecting the keyboard to any surface, and displaying picture of the keyboard with user's hands.

4. An information input processing, gesture-key mapping computer system for generating text from hand gestures of a user relative to an invisible virtual keyboard, the system comprising one or several cameras, one or more memories with CPU connected to the cameras, and processes running in the CPU that associate gesture movements with typing and produce gesture associated textual output, where the gesture-key processing is provided using the following modules:
   a) a gesture capturing module that captures gestures, relative to an invisible keyboard and made without touching any touch sensors, through camera sensors;
   b) a gesture classificator module that classifies the gestures into;
   c) an associator module for associating each of the classes with one or more possible keys of the invisible keyboard, for each of said classes, assign a probability to each of the possible keys associated with the class; and
   d) an integrator module that integrates the probabilities assigned to the possible keys to identify a word for a sequence of gestures; and wherein the integrator module includes one or more of the following:
   a) language module component that estimate probabilities of word strings corresponding to key candidate sequences;
   b) character frequency module that estimate probabilities of character strings corresponding key candidate sequences;
   c) confusable matrix that estimate how often correct gesture classes are confusable with another gesture classes;
   d) gesture classes probability model that estimate probability of observing a string of gesture classes given a sequence of gesture frames;
   e) computation of a probability of production a sequence of keys given a string of gesture frames;
   f) generation of a lattice of sequences of keys given sequence of gesture frames;
   g) finding the most probable sequence of keys from the lattice of key candidate strings.

5. A system according to claim 4, wherein each sequence of keys receives a probability score, and the sequences of keys that receive low scores are removed and are not continuing when new candidates for keys arrive.

6. A system according to claim 4, further comprising a gesture correlator module to allow to adjust automatically the invisible keyboard to changes in the hand positions of the user, and wherein the gesture correlator module acts between the gesture classificator module and the associator module to maintain a consistent mapping of gesture classes to keys of the invisible keyboard despite said changes in the hand positions of the user.

7. The method for producing a textual output in which a user makes typing like gestures relative to an invisible virtual keyboard made without touching any touch sensors and without the presence of a real keyboard and the gestures are associated with the most probable keys that would be typed if a keyboard were presented, said method including the steps of using a computer system to map gestures made, without touching any touch sensors, to keys of the virtual keyboard, including the steps of running processes on the computer to capture gesture images, to classify the gesture images into classes, to associate each of the classes with one or more possible keys of the invisible keyboard, for each of said classes, to assign a probability to each of the possible keys associated with the class, and to integrate the probabilities assigned to the possible keys to identify a word for a sequence of gestures; and wherein the processes to integrate the probabilities use one or more of the following:

a) language module component that estimate probabilities of word strings corresponding to key candidate sequences;
b) character frequency module that estimate probabilities of character strings corresponding key candidate sequences;
c) confusable matrix that estimate how often correct gesture classes are confusable with another gesture classes;
d) gesture classes probability model that estimate probability of observing a string of gesture classes given a sequence of gesture frames;
e) computation of a probability of production a sequence of keys given a string of gesture frames;
f) generation of a lattice of sequences of keys given sequence of gesture frames;
g) finding the most probable sequence of keys from the lattice of key candidate strings.

8. The method for producing a textual output in which a user makes typing like gestures relative to an invisible virtual keyboard and without the presence of a real keyboard and the gestures are associated with the most probable keys that would be typed if a keyboard were presented, said method including the step of using a computer system to map gestures made, without touching any touch sensors, to keys of the virtual keyboard, including the step of running processes on the computer to capture gesture images, to classify the gesture images into classes, to associate each of the classes with one or more possible keys of the invisible keyboard, for each of said classes, to assign a probability to each of the possible keys associated with the class, and to integrate the probabilities assigned to the possible keys to identify a word for a sequence of gestures, and wherein the probability is computed using HMM; and
wherein the processes to integrate the probabilities use one or more of the following:
a) language module component that estimate probabilities of word strings corresponding to key candidate sequences;
b) character frequency module that estimate probabilities of character strings corresponding key candidate sequences;
c) confusable matrix that estimate how often correct gesture classes are confusable with another gesture classes;
d) gesture classes probability model that estimate probability of observing a string of gesture classes given a sequence of gesture frames;
e) computation of a probability of production a sequence of keys given a string of gesture frames;
f) generation of a lattice of sequences of keys given sequence of gesture frames;
g) finding the most probable sequence of keys from the lattice of key candidate strings.

9. A method of typing using a virtual keyboard having a multitude of virtual keys, comprising the steps:
making typing gestures relative to an invisible virtual keyboard made without touching any touch sensors and without any real keyboard;
sensing the typing gestures; and
producing, from the sensed typing gestures, gesture associated textual output including the step of running processes on a computer to capture gesture images, to classify the gesture images into classes, to associate each of the classes with one or more possible keys of the invisible keyboard, for each of said classes, to assign a probability to each of the possible keys associated with the class, and to integrate the probabilities assigned to the possible keys to identify a word for a sequence of gestures; and
wherein the processes to integrate the probabilities use one or more of the following:
a) language module component that estimate probabilities of word strings corresponding to key candidate sequences;
b) character frequency module that estimate probabilities of character strings corresponding key candidate sequences;
c) confusable matrix that estimate how often correct gesture classes are confusable with another gesture classes;
d) gesture classes probability model that estimate probability of observing a string of gesture classes given a sequence of gesture frames;
e) computation of a probability of production a sequence of keys given a string of gesture frames;
f) generation of a lattice of sequences of keys given sequence of gesture frames;
g) finding the most probable sequence of keys from the lattice of key candidate strings.

10. A method according to claim 9, wherein the typing gestures are made by a person, and further comprising the steps of providing feedback to the person on texture output associated with the gestures.

11. A method according to claim 10, wherein the step of providing feedback includes the step of displaying an image of typing keys associated with the gestures.

12. A method according to claim 9, wherein the step of running processes on the computer includes the step of mapping the sensed typing gestures to keys of the keyboard based on a statistical machine that interprets sequences of typing like gesture classes as intended words based on user typing gesture models.

13. A method according to claim 9, wherein gesture input is represented as wave forms that are digitized and clustered in gesture frames, and then processed by HMM machines that represent difference models for different typing patterns; and the step of running processes includes the step of using two statistical components, a first statistical component to map gestures to keys, and a second, language model component to map keys to letters and words.

14. A method of typing using an invisible virtual keyboard, comprising the steps:
making typing gestures relative to an invisible virtual keyboard made without touching any touch sensors and without any real keyboard;
sensing the typing gestures; and
producing, from the sensed typing gestures, gesture associated textual output: and wherein the producing step includes the steps of classifying the gestures into classes, associating each of said classes with one or more possible keys of the invisible keyboard, for each of said classes, assign a probability to each of the possible keys associated with the class, and integrating the probabilities assigned to the possible keys to identifying a word for a sequence of gestures; and
wherein the step of integrating the probabilities includes the step of using one or more of the following:
a) language module component that estimate probabilities of word strings corresponding to key candidate sequences;
b) character frequency module that estimate probabilities of character strings corresponding key candidate sequences;

c) confusable matrix that estimate how often correct gesture classes are confusable with another gesture classes;

d) gesture classes probability model that estimate probability of observing a string of gesture classes given a sequence of gesture frames;

e) computation of a probability of production a sequence of keys given a string of gesture frames;

f) generation of a lattice of sequences of keys given sequence of gesture frames;

g) finding the most probable sequence of keys from the lattice of key candidate strings.

15. A method according to claim 14, wherein the producing step further includes the step of associating gesture classes with individual typing keys.

16. A method according to claim 14, further comprising providing training data in words or sentences with certain timing data.

17. A typing system using an invisible keyboard, comprising:

means for sensing typing gestures made relative to an invisible virtual keyboard made without touching any touch sensors and without any real keyboard; and means for producing, from the sensed typing gestures, gesture associated textual output said producing means including a computer and processes running on the computer to capture gesture images, to classify the gesture images into classes, and to associate each of the classes with one or more possible keys of the invisible keyboard, for each of said classes, to assign a probability to each of the possible keys associated with the class, and to integrate the probabilities assigned to the possible keys to identify a word for a sequence of gestures; and wherein the processes to integrate the probabilities use one or more of the following:

a) language module component that estimate probabilities of word strings corresponding to key candidate sequences;

b) character frequency module that estimate probabilities of character strings corresponding key candidate sequences;

c) confusable matrix that estimate how often correct gesture classes are confusable with another gesture classes;

d) gesture classes probability model that estimate probability of observing a string of gesture classes given a sequence of gesture frames;

e) computation of a probability of production a sequence of keys given a string of gesture frames;

f) generation of a lattice of sequences of keys given sequence of gesture frames;

g) finding the most probable sequence of keys from the lattice of key candidate strings.

18. A system according to claim 17, wherein the typing gestures are made by a person, and further comprising means for providing feedback to the person on texture output associated with the gestures.

19. A system according to claim 18, wherein the means for providing feedback includes means for displaying an image of typing keys associated with the gestures.

20. A typing system using an invisible virtual keyboard, comprising:

means for sensing typing gestures made relative to a virtual, invisible keyboard made without touching any touch sensors and without any real keyboard; and means for producing, from the sensed typing gestures, gesture associated textual output; and wherein the producing means includes means for classifying the gestures into classes, for associating each of said classes with one or more possible keys of the invisible keyboard, for each of said classes, for assigning a probability to each of the possible keys associated with the class, and for integrating the probabilities assigned to the possible keys to identifying a word for a response of gestures; and wherein the means for integrating the probabilities includes one or more of the following:

a) language module component that estimate probabilities of word strings corresponding to key candidate sequences;

b) character frequency module that estimate probabilities of character strings corresponding key candidate sequences;

c) confusable matrix that estimate how often correct gesture classes are confusable with another gesture classes;

d) gesture classes probability model that estimate probability of observing a string of gesture classes given a sequence of gesture frames;

e) computation of a probability of production a sequence of keys given a string of gesture frames;

f) generation of a lattice of sequences of keys given sequence of gesture frames;

g) finding the most probable sequence of keys from the lattice of key candidate strings.

21. A system according to claim 20, wherein the producing means further includes means for associating gesture classes with individual typing keys.

* * * * *